United States Patent
Wang et al.

(10) Patent No.: US 9,907,092 B2
(45) Date of Patent: Feb. 27, 2018

(54) UPLINK SYNCHRONIZATION WITHOUT PREAMBLE IN SC-FDMA

(71) Applicant: QUALCOMM Incorporated, San Diego, CA (US)

(72) Inventors: Xiao Feng Wang, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 14/542,470

(22) Filed: Nov. 14, 2014

(65) Prior Publication Data
US 2016/0105910 A1 Apr. 14, 2016

Related U.S. Application Data

(60) Provisional application No. 62/062,106, filed on Oct. 9, 2014.

(51) Int. Cl.
*H04W 74/08* (2009.01)
*H04W 56/00* (2009.01)

(52) U.S. Cl.
CPC ... *H04W 74/0833* (2013.01); *H04W 56/0045* (2013.01)

(58) Field of Classification Search
CPC combination set(s) only.
See application file for complete search history.

(56) References Cited

U.S. PATENT DOCUMENTS

| | | | |
|---|---|---|---|
| 8,031,692 B2 | 10/2011 | Jeong et al. | |
| 8,477,712 B2 | 7/2013 | Hao et al. | |
| 8,837,614 B2 | 9/2014 | Li et al. | |
| 2006/0013176 A1* | 1/2006 | De Vos | H04W 36/14 370/338 |
| 2006/0083211 A1* | 4/2006 | Laroia | H04L 5/0042 370/343 |
| 2008/0267126 A1* | 10/2008 | Vujcic | H04B 7/2637 370/330 |
| 2009/0170514 A1* | 7/2009 | Yokoyama | H04W 74/08 455/436 |
| 2009/0175220 A1* | 7/2009 | Yi | H04B 7/0602 370/328 |
| 2009/0215450 A1* | 8/2009 | Baldemaier | H04W 74/0891 455/434 |
| 2009/0274105 A1* | 11/2009 | Choi | H04L 5/0016 370/329 |
| 2011/0274040 A1 | 11/2011 | Pani et al. | |
| 2011/0310854 A1* | 12/2011 | Zou | H04W 74/0891 370/336 |
| 2013/0100938 A1 | 4/2013 | Kwon et al. | |

(Continued)

OTHER PUBLICATIONS

International Search Report and Written Opinion—PCT/US2015/052432—ISA/EPO—dated Dec. 16, 2015.

(Continued)

*Primary Examiner* — Yee Lam
(74) *Attorney, Agent, or Firm* — Arent Fox, LLP

(57) ABSTRACT

A method, an apparatus, and a computer program product for wireless communication are provided. The apparatus may determine an allocated set of resources within a PRACH period. The apparatus may transmit pilot signals in the determined allocated set of resources.

15 Claims, 9 Drawing Sheets

(56) References Cited

U.S. PATENT DOCUMENTS

2013/0308567 A1* 11/2013 Chen ................ H04L 5/005
                                                              370/329

OTHER PUBLICATIONS

Motorola: "Synchronized Random Access Design," 3GPP Draft; R1-061709 vol. RAN WG1. No. Cannes, France; Jun. 7, 2006-Jun. 30, 2006 dated Jun. 20, 2006 (Jun. 20, 2006), XP050951127, Retrieved from the Internet : URL : http://www./3gpp.org./ffp/tsg_ran/WG1_RL1/TSGR1_AH/LTE_AH_0606/Docs/.
Nokia: "COM Multiplexing of Synchronous RACH," 3GPP Draft; R1-063361 vol. RAN WG1, No. Riga, Latvia; Nov. 1, 2006, Nov. 1, 2006 (Nov. 1, 2006) XP050103803.
Texas Instruments: "UL Synchronization Management and Maintenance in E-UTRA", 3GPP Draft; R1-072198 Ulsync, 3rd Generation Partnership Project (3GPP), Mobile Competence Centre ; 650, Route Des Lucioles ; F-06921 Sophia-Antipolis Cedex ; France, vol. RAN WG1, No. Kobe, Japan; May 1, 2007, May 1, 2007 (May 1, 2007), XP050105936, [retrieved on May 1, 2007] the whole document.

* cited by examiner

UPLINK SYNCHRONIZATION WITHOUT PREAMBLE IN SC-FDMA

CROSS-REFERENCE TO RELATED APPLICATION(S)

This application claims the benefit of U.S. Provisional Application Ser. No. 62/062,106, entitled "UPLINK SYNCHRONIZATION WITHOUT PREAMBLE IN SC-FDMA," and filed on Oct. 9, 2014, which is expressly incorporated by reference herein in its entirety.

BACKGROUND

Field

The present disclosure relates generally to communication systems, and more particularly, to performing uplink synchronization without a preamble in single-carrier (SC) frequency division multiple access (FDMA) (SC-FDMA).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a UE. The apparatus determines an allocated set of resources within a physical random access channel (PRACH) period. The apparatus transmits pilot signals in the determined allocated set of resources.

Another aspect of the disclosure provides an apparatus for wireless communication that includes means for determining an allocated set of resources within a PRACH period. The apparatus includes means for transmitting pilot signals in the determined allocated set of resources. The PRACH period has a set of slots, in which each slot in the set of slots includes a set symbols, and each symbol in each set of symbols includes a set of tones. The means for determining the allocated set of resources is configured to determine a subset of slots within the set of slots in the PRACH period for transmitting the pilot signals, in which the subset of slots includes a set of even number indexed slots and a set of odd number indexed slots, to determine a first set of tone indices in the set of even number indexed slots for transmitting a first set of pilot signals, and to determine a second set of tone indices in the set of odd number indexed slots for transmitting a second set of pilot signals, in which the second set of tone indices is based on the first set of tone indices and an offset value. The means for determining the allocated set of resources is configured to determine a subset of symbols within each slot in the subset of slots in the PRACH period for transmitting the pilot signals, in which the subset of symbols within each slot is greater than or equal to 2. The first set of pilot signals has at least two pilot signals, and the second set of pilot signals has at least two pilot signals. The apparatus further includes means for transmitting information in the determined allocated set of resources, in which the information includes at least one of an identifier, control information, or a pathloss report.

Another aspect of the disclosure provides a computer program product stored on a computer-readable medium and the computer program product includes code that when executed on at least one processor causes the at least one processor to determine an allocated set of resources within a PRACH period and to transmit pilot signals in the determined allocated set of resources. The PRACH period has a set of slots, in which each slot in the set of slots includes a set symbols, and each symbol in each set of symbols includes a set of tones. The determining the allocated set of resources includes determining a subset of slots within the set of slots in the PRACH period for transmitting the pilot signals, in which the subset of slots includes a set of even number indexed slots and a set of odd number indexed slots, determining a first set of tone indices in the set of even number indexed slots for transmitting a first set of pilot signals, and determining a second set of tone indices in the set of odd number indexed slots for transmitting a second set of pilot signals, in which the second set of tone indices is based on the first set of tone indices and an offset value. The determining the allocated set of resources further includes determining a subset of symbols within each slot in the subset of slots in the PRACH period for transmitting the pilot signals, in which the subset of symbols within each slot is greater than or equal to 2. The first set of pilot signals has at least two pilot signals, and the second set of pilot signals has at least two pilot signals. The computer program product further includes code that when executed on the at least one processor causes the at least one processor to transmit information in the determined allocated set of resources. The information includes at least one of an identifier, control information, or a pathloss report.

In another aspect of the disclosure, a method, a computer program product, and an apparatus are provided. The apparatus may be a wireless device (e.g., a base station). The apparatus receives a data transmission from a user equipment (UE). The apparatus determines a channel phase offset based on the received data transmission. The apparatus determines a timing offset based on the determined channel phase offset. The apparatus transmits an acknowledgment message to the UE. The acknowledgment message includes the determined timing offset.

Another aspect of the disclosure provides an apparatus for wireless communication that includes means for receiving a data transmission from a UE, means for determining a channel phase offset based on the received data transmission, means for determining a timing offset based on the determined channel phase offset, and means for transmitting an acknowledgment message to the UE. The acknowledgment message includes the determined timing offset. The data transmission is received in an allocated set of resources within a PRACH period. The data transmission includes pilot signals, and the pilot signals are received in a first set of tone indices and a second set of tone indices, the first set of tone indices being associated with a set of even number indexed slots of the PRACH period and the second set of tone indices being associated with a set of odd number indexed slots of the PRACH period. The second set of tone indices is based on the first set of tone indices and an offset value. The data transmission further includes at least one of an identifier, control information, or a pathloss report. The means for determining the channel phase offset is configured to determine a first channel phase offset based on the received data transmission and to determine a second channel phase offset based on the received data transmission, and the means for determining the timing offset is configured to determine the timing offset based on the first channel phase offset and the second channel phase offset.

Another aspect of the disclosure provides a computer program product stored on a computer-readable medium. The computer program product includes code that when executed on at least one processor causes the at least one processor to receive a data transmission from a UE, to determine a channel phase offset based on the received data transmission, to determine a timing offset based on the determined channel phase offset, and to transmit an acknowledgment message to the UE. The acknowledgment message includes the determined timing offset. The data transmission is received in an allocated set of resources within a PRACH period. The data transmission includes pilot signals, and the pilot signals are received in a first set of tone indices and a second set of tone indices, in which the first set of tone indices is associated with a set of even number indexed slots of the PRACH period and the second set of tone indices is associated with a set of odd number indexed slots of the PRACH period. The second set of tone indices is based on the first set of tone indices and an offset value. The data transmission further includes at least one of an identifier, control information, or a pathloss report. The determining the channel phase offset includes determining a first channel phase offset based on the received data transmission and determining a second channel phase offset based on the received data transmission. The determining the timing offset includes determining the timing offset based on the first channel phase offset and the second channel phase offset.

DETAILED DESCRIPTION

Figure 1:
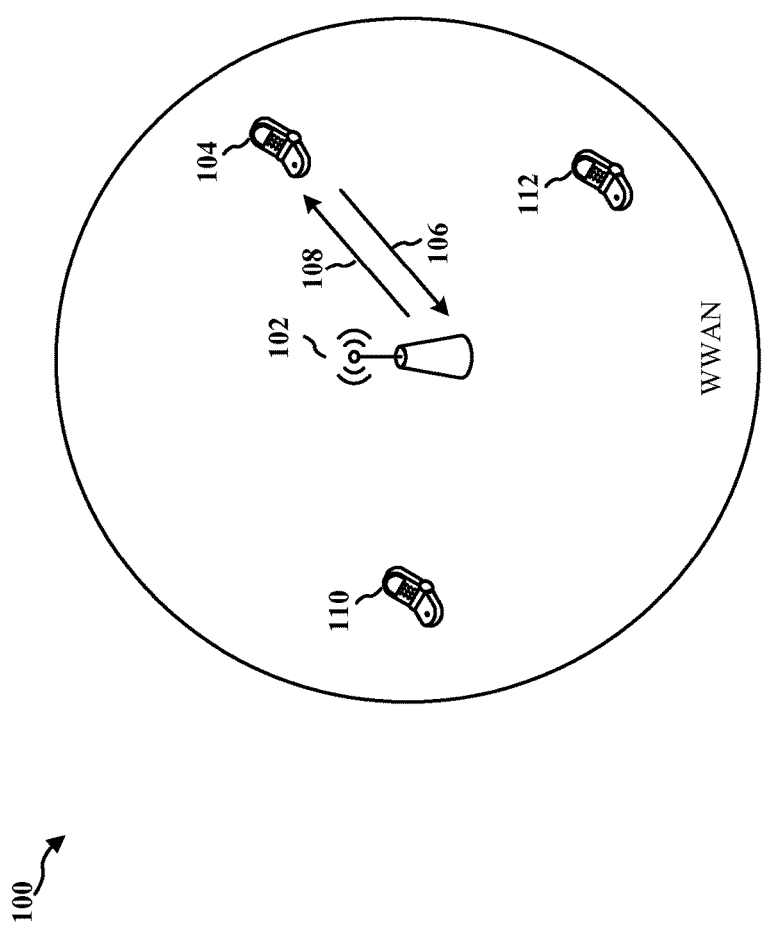
FIG. 1 is a diagram of a wireless communications system.

The detailed description set forth below in connection with the appended drawings is intended as a description of various configurations and is not intended to represent the configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram of a wireless communications system 100. The wireless communications system 100 includes a number of wireless devices. The wireless communications system 100 may overlap with a cellular communications system, such as for example, a wireless wide area network (WWAN). In FIG. 1, a UE 104 may transmit a first information 106 in an uplink (UL) transmission to a base station 102 (e.g., an eNodeB (eNB)). The base station 102 may transmit a second information 108 to the UE 104 in a downlink (DL) transmission. Although FIG. 1 illustrates three UEs (e.g., the UEs 104, 110, 112), more or less UEs may be present.

In wireless communications systems with single-carrier frequency division multiple access (SC-FDMA) uplink (UL), a cyclic prefix (CP) may be added before an SC-FDMA symbol to ensure orthogonality among signals. For minimal overhead, the CP length is typically set to be the maximum time dispersion of the channels without considering the difference in roundtrip delay, which may be significant in cellular systems. As such, a UE may need to know its roundtrip delay and adjust its transmission time accordingly before the UE may start normal uplink data transmission. The process of timing acquisition and adjustment for UL transmission is known as UL synchronization. In LTE, initial UL synchronization may be done by using a preamble signal specifically designed for timing estimation. Before any other uplink transmission, a UE may send a preamble signal to a base station, which the base station uses to estimate the roundtrip delay of the UE and to send the corresponding time advance command to the UE. UL synchronization using preambles, however, increases the air time of a UE, which may be undesirable for applications where the power consumption of UEs is critical, such as in Cellular Internet of Things (CIOT). Additionally, preamble signals often interfere with other signals due to asynchronous transmission. To avoid large interference, guard bands in frequency may be required. As such, a need exists to perform uplink synchronization without using a preamble in SC-FDMA.

Instead of specifically transmitting a preamble signal, a UE may start an UL connection directly with an initial signal, which may include pilot signals, data signals, and any other useful signals, in a designated time-frequency resource. Pilot signals may be known reference signals used by a receiver device (e.g., a base station) to perform channel estimation. Data signals may include UE identification information, control information, resource allocation request, a pathloss report, and other information that may be used for subsequent communications. To reduce overhead, the initial signaling may carry a small amount of data (e.g., 48 bits or less than 100 bits). UL synchronization may be achieved by using specially arranged pilot signals inserted into the initial signal. The initial signal may be known as a physical random access channel (PRACH) signal, in which the PRACH may be used by a UE to request dedicated resources for uplink/downlink data transfer. The time period for transmitting a PRACH signal by a UE may be known as a PRACH period. A PRACH period may be a designated time period and may include a number of symbols used for transmitting data and pilot signals. The symbols used for transmission during the PRACH period may have an extended CP (e.g., 16.7 µs or 33.3 µs), whose duration is long enough to account for channel dispersion and roundtrip delay. For every kilometer of the cell radius, for example, a roundtrip delay may be 6.7 µs. If the PRACH period allowed for transmitting PRACH signals is small, then the overall overhead due to using extended CP may be small.

For purposes of timing estimation, a PRACH period may be divided into a number of L slots (e.g., 20 slots), and each slot may have S symbols (e.g. 10 symbols). As such, each PRACH period may have L×S SC-FDMA symbols. The numbers L and S may be selected based upon values that would support successful timing estimation and PRACH data communication for the largest channel path loss. Within a slot, the number of pilot signals, P, may be greater than or equal to 2. For example, assuming a slot has a minimum of 2 symbols, and one tone is allocated for pilot signal transmission in the slot, then the slot will have 2 pilot signals, 1 pilot signal for each symbol on the same allocated tone. In another example, a slot may have 10 symbols total, 2 symbols may be used for pilot signal transmission and 8 symbols for data signal transmission. If a slot has more than 1 tone allocated for pilot signal transmission, then the tones may be evenly distributed within the symbol. Within the L slots, numbered with indices 0, 1, . . . L−1, a logical (or virtual) tone index is introduced that maps to a physical tone index depending on whether the slot is an even number indexed slot or an odd number indexed slot. Logical tone index m may refer to a physical tone index m at even number indexed slots (e.g., 0, 2, 4, . . . ) and (m+g) (mod N) or mod(m+g,N) at odd number indexed slots (e.g., 1, 3, 5, . . . ), in which N is a total number of tones available in a symbol (or available in a symbol not including guard tones and DC tones) and g is a predetermined offset or hop. In an aspect, a pilot signal may hop from tone index to tone index depending whether the pilot signal is being transmitted on an even or odd number indexed slot. In one aspect, if N is the total number of tones available in a symbol, all signals (data signals and pilot signals) transmitted in the PRACH period may hop from one tone index to another tone index. In another aspect, N may represent the total number of tones available to transmit PRACH signals.

A PRACH channel or a data channel may be assigned a number of logical tones within each PRACH period. That is, all signal transmissions hop g tones at the beginning of each odd number indexed slot. At slot 0, and any other even number indexed slots, logical tone indices may be the same as the physical tone indices. The value of g may be chosen to be the largest number such that the PRACH channel is constant (or nearly constant) within a frequency range of g tones and is also smaller than the ratio of symbol duration over the maximum roundtrip delay to avoid phase ambiguity. For example, g may be equal to 4, 6, or 8.

Within each PRACH period, the total resources allocated for PRACH may be further divided in a number of PRACH resource blocks, and the PRACH resource blocks may be of different sizes. Each PRACH resource block may consist of an even number of contiguous slots and start from an even-numbered slot (e.g., slot 0, slot 2, slot 4). A UE may randomly choose a PRACH resource block of appropriate size for PRACH transmission. A PRACH resource block may be assigned a number of tones (e.g., logical tones) for pilot and data signal transmission and include at least two slots.

Figure 2:
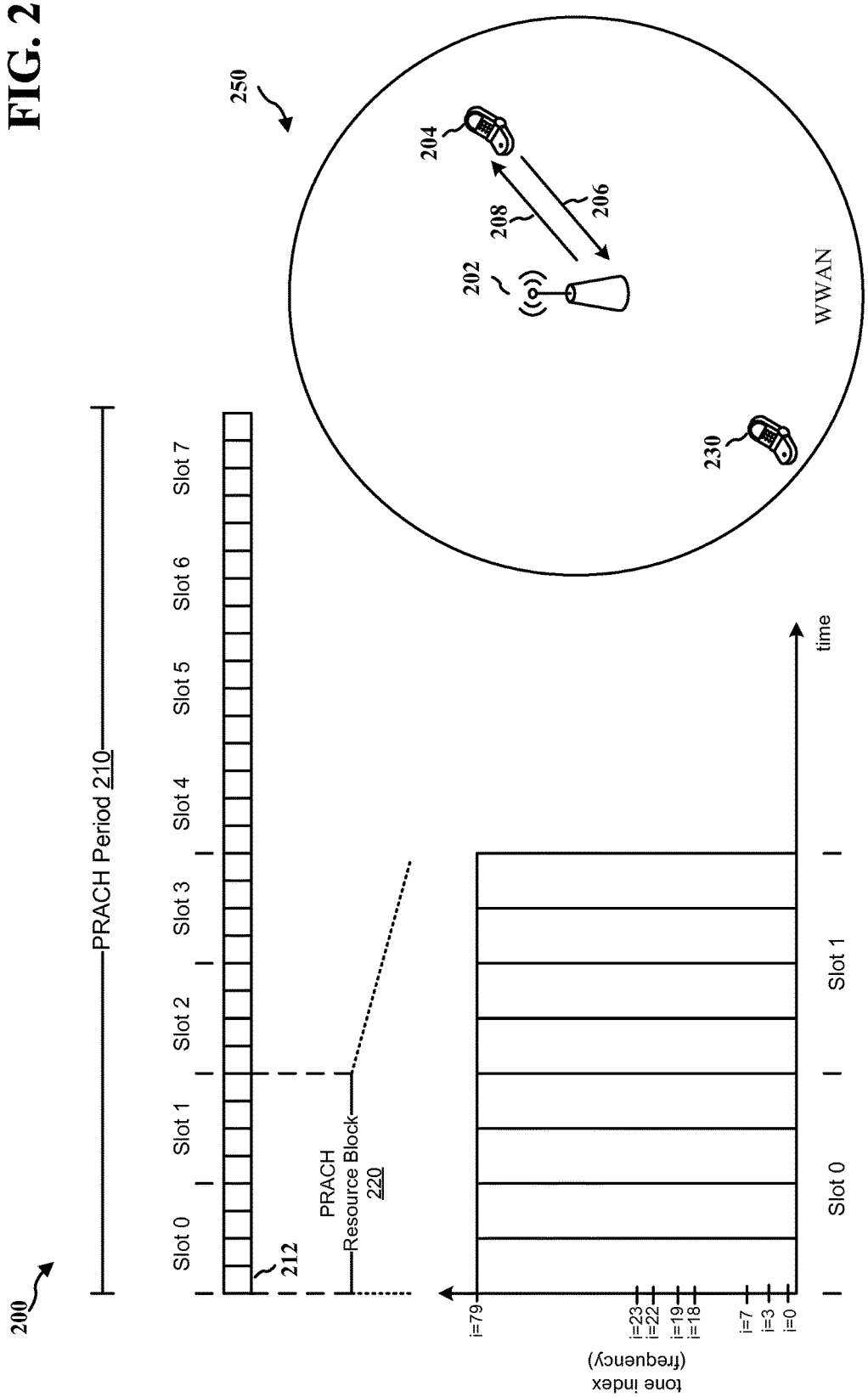
FIG. 2 illustrates a diagram of a PRACH period and a diagram of a method for utilizing a PRACH period for uplink synchronization in SC-FDMA.

FIG. 2 illustrates a diagram 200 of a PRACH period and a diagram 250 of a method for utilizing a PRACH period for uplink synchronization in SC-FDMA. As shown in FIG. 2, a PRACH period 210 may have 8 slots with slot indices 0-7. Each slot may have 4 symbols 212 (or some other number of symbols greater than or equal to 2). In one configuration, two or more contiguous slots (e.g., slot 0, slot 1) may be grouped into a PRACH resource block 220. In an aspect, a symbol may have 80 tones with tone indices 0 to 79 (or another number of tones such as 128 or 256). In another configuration, the PRACH period 210 may have at least 2 slots, and each slot may have at least 2 symbols. The PRACH period 210 may be preconfigured within a base station 202 and/or one or more UEs 204, 230. The base station 202 and/or one or more UEs 204, 230 may receive configuration information indicating when the PRACH period 210 will occur. For example, the UE 204 may receive configuration information from the base station 202, which may receive the configuration information from another network entity.

In one example, the UE 204 may select the PRACH resource block 220 with two slots, each slot having 4 symbols. Assuming the total number of available tones in each symbol is 80 (e.g., i=0, . . . , 79) and a offset value/hopping distance is equal to 4 (g=4) and the PRACH resource block 220 is allocated 1 tone, such as logical tone index 3, and 2 slots, each assigned one tone index for pilot signal transmission, the UE may transmit a pilot signal at physical tone index 3 at slot 0, and transmit a pilot signal at physical tone index 7 at slot 1. In another example, if the PRACH resource block 220 has 4 allocated slots and 1 tone index such as logical tone index 3 allocated for transmission of pilot signals, then the pilot signals maybe transmitted at physical tone index 3 at slot 0, physical tone index 7 at slot 1, physical tone index 3 at slot 2, and physical tone index 7 at slot 3. Similarly, in another example, assuming g=4, if the PRACH resource block 220 has 2 logical tone indices 18 and 19 and slots 4 to 7, then pilot signals may be transmitted on physical tone indices 18 and 19 at slot 4, physical tone indices 22 and 23 at slot 5, physical tone indices 18 and 19 at slot 6, and physical tone indices 22 and 23 at slot 7. In an aspect, when more than one tone index per slot is allocated for the transmitting pilot signals, a UE may transmit pilot signals on a subset of allocated tone indices. For example, if 6 tone indices are allocated per slot, a UE may transmit pilot signals on one or more of the 6 allocated tone indices.

In another example, if PRACH resource blocks 220 within a PRACH period 210 have different sizes, the UE 204, closer to the base station 202 compared to the UE 230, may select a smaller PRACH resource block (e.g., 2 slots) and transmit data signals with a higher-order modulation (e.g., pilot signals may be known BPSK signals and data signals may use different modulation schemes depending on a channel condition). A UE 230 further away from the base station 202 may select a larger PRACH resource block (4 or more slots) and transmit data signals with a lower-order modulation. In an aspect, the UE 230 may listen to a broadcast channel of the base station 202, which may include PRACH resource allocation information. In this aspect, the UE 230 may measure channel conditions while performing downlink synchronization with the base station 202. The UE 230 may select a PRACH resource block based on the received PRACH resource allocation information and the measured channel conditions.

Referring to diagram 250 in FIG. 2, the UE 204 may determine an allocated set of resources within the PRACH period 210. The allocated set of resources may be a set of slots, and each slot may include a set of symbols, and each symbol may include a set of tones. In another configuration, the allocated set of resources may be a PRACH resource block 220 that includes a set of slots. In an aspect, the UE 204 may randomly select an allocated set of resources for PRACH transmission. In another aspect, the UE 204 may select an allocated set of resources whose size is appropriate for PRACH transmission based on a measured channel condition. In another aspect, the UE 204 may determine the allocated set of resources based on a preconfigured setting (e.g., based on a UE identifier). The allocated set of resources may be (or have) a subset of slots, and the subset of slots may include a set of even number indexed slots and a set of odd number indexed slots. For example, an allocated set of resources may have 2 slots with slot index 0 and slot index 1. The UE 204 may determine that a set of logical tone indices has been allocated for slots. For example, if logical tone indices 3 and 6 have been allocated, then for the even number indexed slots (e.g., slot 0), the UE 204 may determine a first set of physical tone indices (e.g., tone indices 3 and 6) for transmitting a first set of pilot signals. For the odd number indexed slots, the UE 204 may determine a second set of physical tone indices for transmitting a second set of pilot signals. The second set of physical tone indices may be determined based on the first set of tone indices plus the offset value, g. In an example, if the first set of physical (or logical) tone indices is 3 and 6, assuming g=4, the second set of physical tone indices is 7 and 10. Although an example with 2 tone indices per set of tone indices is provided, there may be 1 or more than 1 tone index per set of tone indices. Having determined the tone indices and the symbols within the slots on which to transmit the pilot signals, the UE 204 may transmit 206 the pilot signals in the determined allocated set of tone indices in the respective symbols to the base station 202. The base station 202 may receive the data transmission from the UE 204. Based on the data transmission from the UE 204, the base station 202 may determine a channel phase offset. In one configuration, the base station 202 may determine a channel phase offset between channels seen at the same frequency/tone but at different chosen times. In this configuration, the base station 202 may determine a timing offset based on the determined phase offset.

In another configuration, the base station 202 may determine a first channel phase offset between channels seen at the same frequency/tone but at different chosen times and determine a second channel phase offset between channels seen at two tones with a chosen offset but close in time. In this configuration, the base station 202 may determine the timing configuration based on the first determined channel phase offset and the second determined channel phase offset. For example, the UE 204 may transmit pilot signals on slots 0 and 1. In slot 0, pilot signals may be transmitted on physical tone index 3 of symbols 0 and 2. Assuming an offset value, g=4, at slot 1, the UE 204 may transmit pilot signals at slot 1 on physical tone indices 7 of symbols 0 and 2. Upon receiving these pilot signals, the base station 202 may determine a first channel phase offset between the pilot signals at physical tone index 3 of symbol 0 in slot 0 and at physical tone index 3 of symbol 2 in slot 0, and between the pilot signals at physical tone index 7 of symbol 0 in slot 1 and at physical tone index 7 of symbol 2 in slot 1. The base station 202 may determine a second channel phase offset between the pilot signals at physical tone index 3 of symbol 0 in slot 0 and at physical tone index 7 of symbol 0 in slot 1 and also between the pilot signals at physical tone index 3 of symbol 2 in slot 0 and at physical tone index 7 of symbol 2 in slot 1. The base station 202 may then determine a timing offset based on the first and the second channel phase offsets.

Having determined the timing offset, the base station 202 may transmit an acknowledgment message 208 to the UE 204. The acknowledgment message 208 may include the determined timing offset (or timing advance), and may also include resource allocation information.

For example, with respect to the base station 202, consider a PRACH block with K tones and 2T (T>0) slots. The base station 202, upon receiving a transmission 206 from the UE 204 that includes pilot signals, may perform a Fast Fourier Transform (FFT) followed by a K-point Inverse Discrete Fourier Transform (IDFT) at the corresponding tone locations to obtain signal y(t,k) for symbol t=0, 1, . . . , 2TS-1 and tone k (k=0, 1, . . . , K-1), where S corresponds to the number of symbols in a slot. For pilot signals, the corresponding outputs of the IDFT signals y(t,k) may be further multiplied by the complex conjugates of the pilot signals to obtain r(t,k). In r(t,k), t may correspond to symbols with pilot signals.

The base station 202 may first estimate the channel phase offset between two neighboring pilots in time due to any residual frequency offset. When the pilot signals within a slot are equally spaced in time, the base station 202 may collect the received signals, r(t,k), corresponding to P symbols with pilot signals, 0, 1, . . . P-2 within each slot and then each tone location sequentially into a column vector x and similarly, collect signals corresponding to pilot symbols 1, 2, . . . , P-1 into another column vector y, both x and y have 2(P-1)TK entries. Accordingly, the phase offset may be estimated as β=angle($x^h y$), where the superscript h stands for the Hermitian transpose. For example, in slot 0, assume there are 3 pilot signals (e.g., P0, P1, P2). All three pilot signals should go through the same channel (assuming the channel stays constant during a slot). Any differences in the corresponding channel estimates on each of the pilot signals (e.g., between P0 and P1, or between P1 and P2) may be frequency offset, which may be used to determine a phase offset.

Once the phase offset due to frequency offset is estimated, the timing may be estimated from the channel phase offset between two pilot signals that are different in physical tone location by g, but close in time (e.g., slot 0 and slot 1). In this case, the channel may be assumed to be nearly constant with the duration of 2 slots. All the pilot signals in the even-number indexed slots may be collected into a column vector w and all the pilot signals in the odd-number indexed slots may be collected into a column vector v in the same order. Both vectors w and v may have KPT entries. The timing offset (or timing of arrival) may be estimated with the following equation:

$$t = -1 \times \text{angle}\left[w^h v e^{-\frac{j\beta S}{D}}\right] N_{fft} / (2\pi g)$$

In the equation above, $N_{fft}$ is the FFT size, D may be the spacing between two pilot signals, and S may be the number of symbols per slot.

Figure 3:
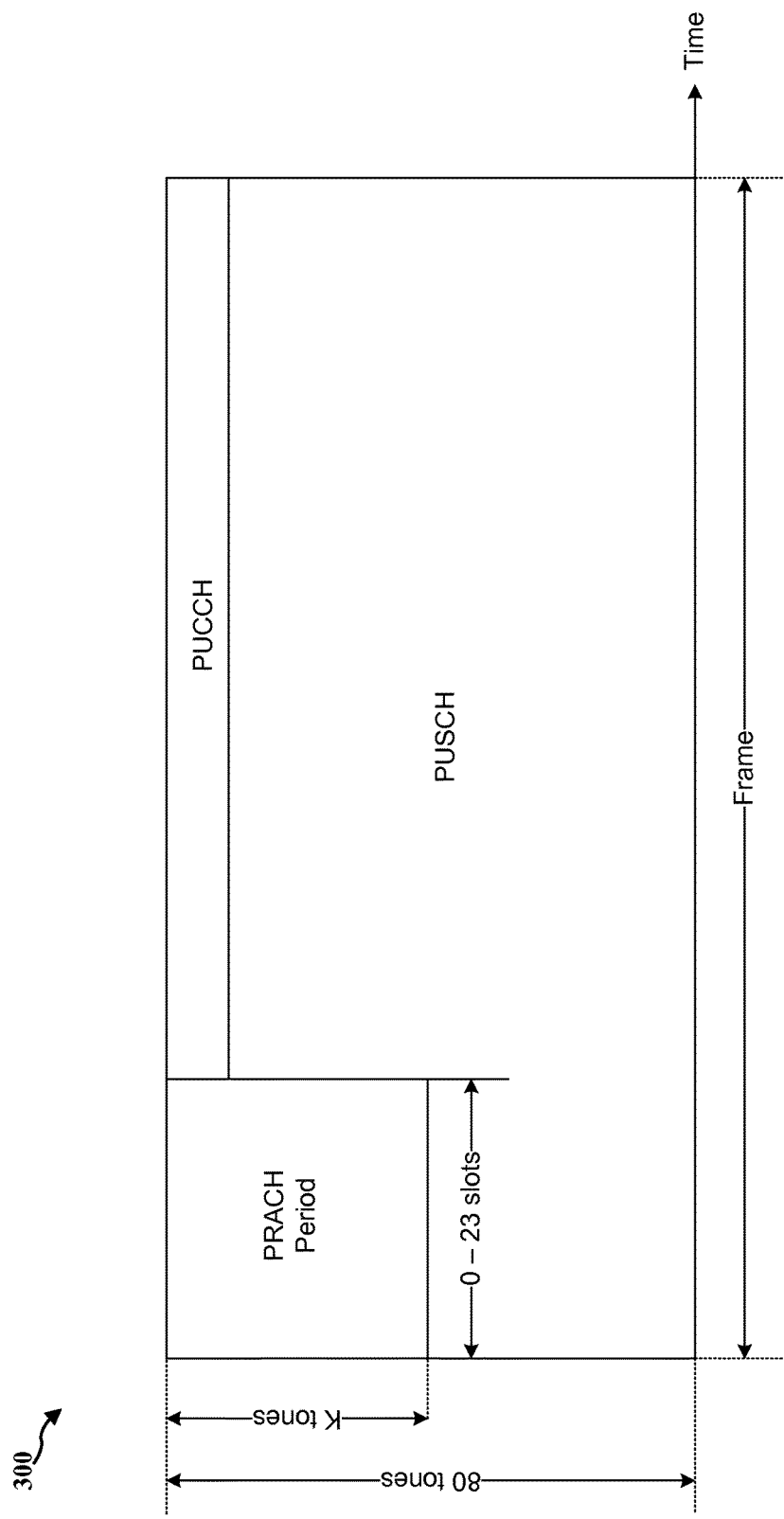
FIG. 3 is a diagram of a physical PRACH channel mapping.

FIG. 3 is a diagram 300 of a physical PRACH channel mapping. As shown in FIG. 3, a PRACH may be next to the physical uplink shared channel (PUSCH) and the physical uplink control channel (PUCCH). A PRACH may occur in every frame or may occur periodically in certain designated frames. In this example, a PRACH has 24 contiguous slots. Each symbol in a slot is assigned K tones for purposes of PRACH signaling, and 80 (or some other value) may be the total number of usable tones or tone indices in a symbol (not including DC tones, guard tones, etc.) In another aspect, the number of tones, K, assigned for purposes of PRACH signaling may be equal to the total number of usable tones in a symbol.

Figure 4:
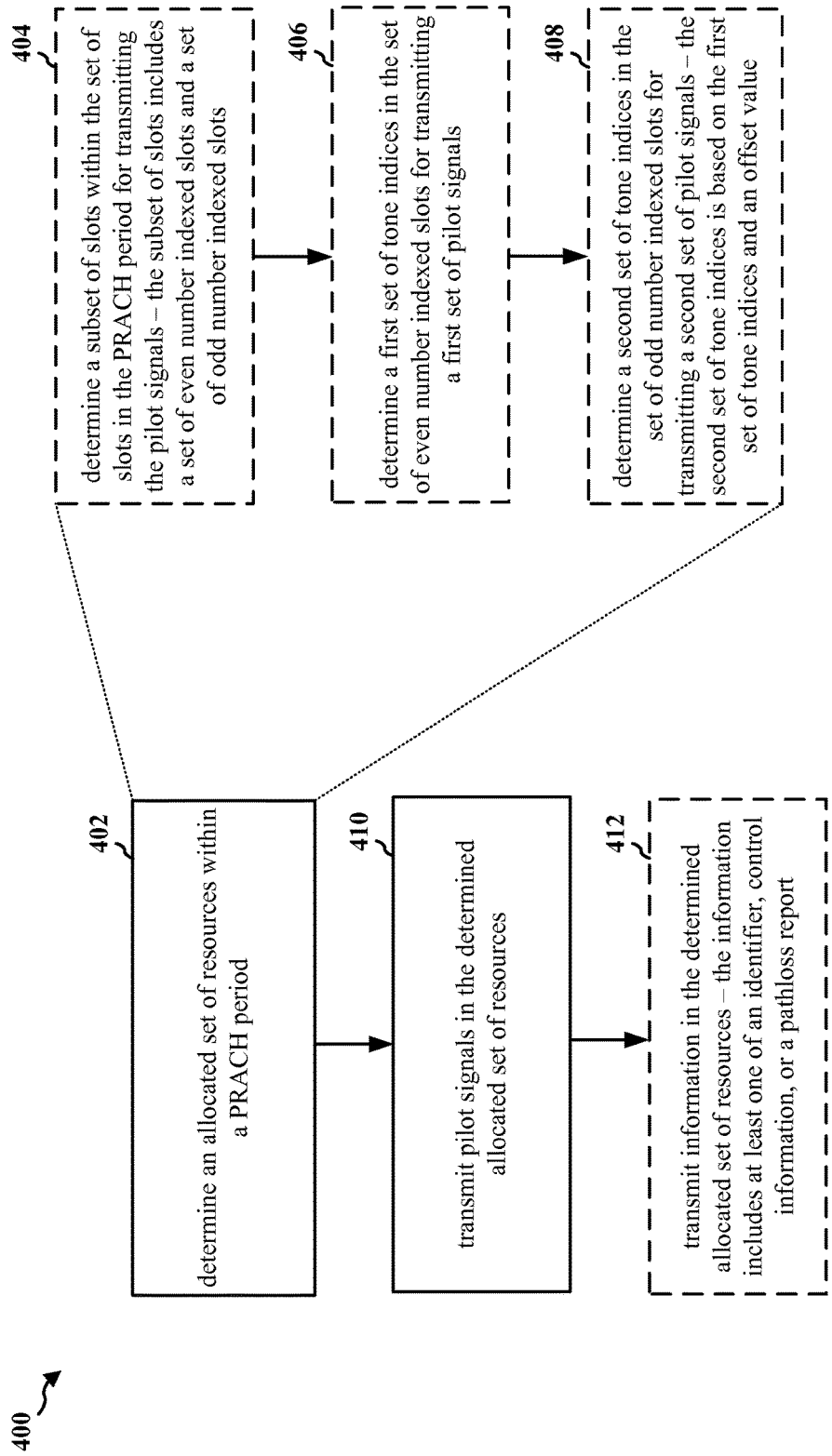
FIG. 4 is a flow chart of a method of wireless communication for uplink synchronization without using a preamble.

FIG. 4 is a flow chart 400 of a method of wireless communication for uplink synchronization without using a preamble. The method may be performed by a UE (e.g., the UEs 104, 204). At step 402, the UE may determine an allocated set of resources within a PRACH period. The PRACH period may have a set of slots, and each slot in the set of slots may include a set symbols, and each symbol in each set of symbols may include a set of tones. In an aspect, the UE may determine the allocated set of resources within the PRACH period by performing steps 404-408. At step 404, the UE may determine a subset of slots within the set of slots in the PRACH period for transmitting the pilot signals. The subset of slots may include a set of even number indexed slots and a set of odd number indexed slots. At step 406, the UE may determine a first set of tone indices in the set of even number indexed slots for transmitting a first set of pilot signals. At step 408, the UE may determine a second set of tone indices in the set of odd number indexed slots for transmitting a second set of pilot signals. The second set of tone indices may be based on the first set of tone indices and an offset value. In an aspect, the first set of pilot signals may have at least two pilot signals, and the second set of pilot signals may have at least two pilot signals. For example, referring to FIG. 2, the UE 204 may select PRACH resource block 220 or a subset of 2 slots. In this example, the PRACH resource block 220 may have 2 slots, an even number indexed slot (slot 0) and an odd number indexed slot (slot 1). In slot 0 of the PRACH resource block 220, tone indices 3 and 7 may be allocated for transmitting a pilot signal. Assuming an offset value of 4, in slot 1, tone indices 7 and 11 may be allocated for transmitting a pilot signal. As such, the first set of pilot signals may be transmitted on tone indices 3 and 7, and the second set of pilot signals may be transmitted on tone indices 7 and 11.

At step 410, having determined the allocated set of resources with the PRACH period, the UE may transmit pilot signals in the determined allocated set of resources. For example, referring to FIG. 2, the UE 204 may transmit pilot signals in slot 0 on tone indices 3 and 7, and in slot 1 on tone indices 7 and 11.

At step 412, the UE may transmit information in the determined allocated set of resources. The information may include at least one of an identifier, control information, or a pathloss report. For example, referring to FIG. 2, the UE 204 may transmit an identifier associated with the UE 204, a resource allocation request, and a pathloss report to the base station 202 in slots 0 and 1.

Figure 5:
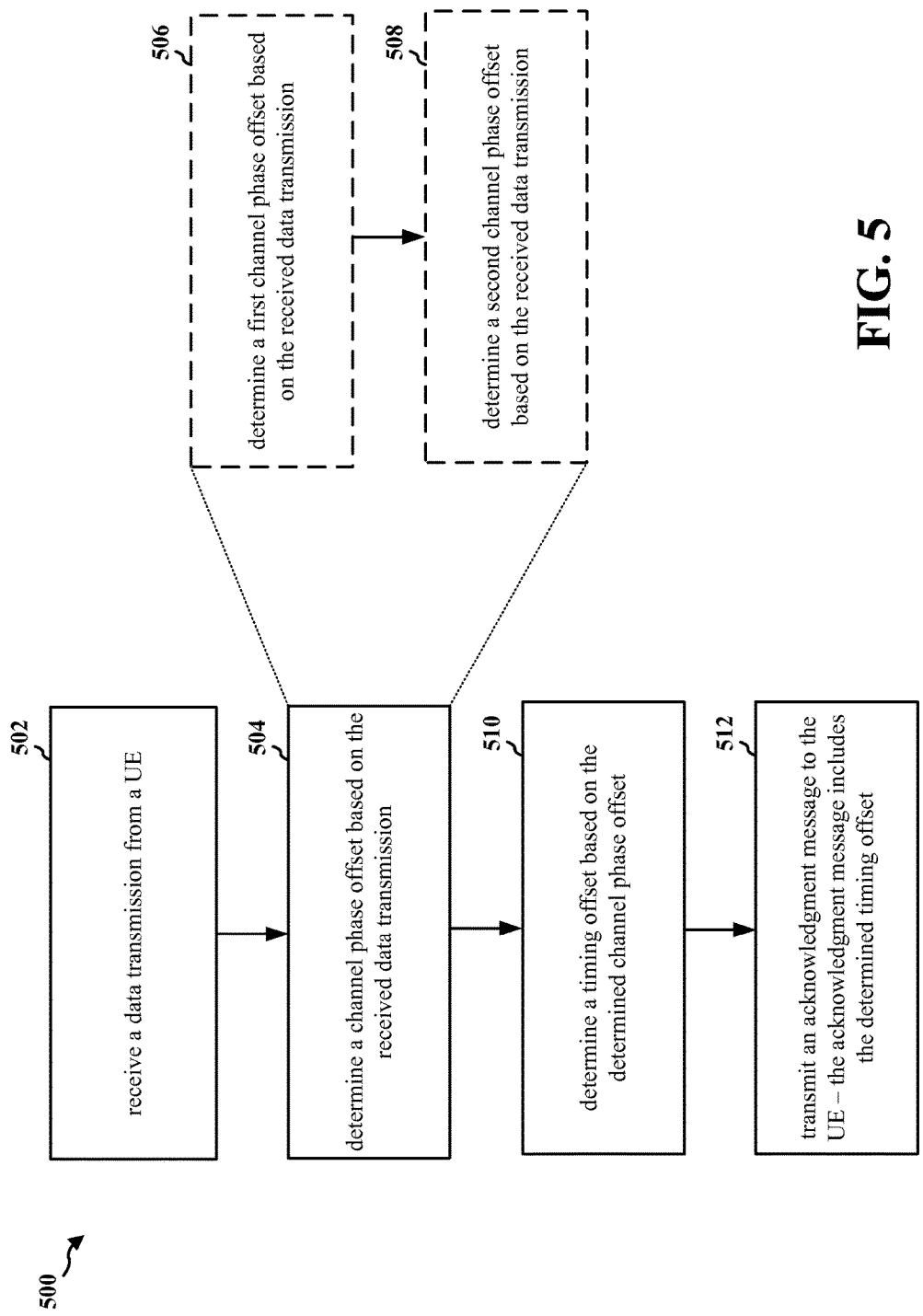
FIG. 5 is a flow chart of a method of wireless communication for determining a timing advance in uplink synchronization without using a preamble.

FIG. 5 is a flow chart 500 of a method of wireless communication for determining a timing advance in uplink synchronization without using a preamble. The method may be performed by an eNB (e.g., the base stations 102, 202). At step 502, the eNB may receive a data transmission from a UE. In an aspect, the data transmission may be received on an allocated set of resources within a PRACH period. In an aspect, the data transmission includes pilot signals. The pilot signals may be received in a first set of tone indices and a second set of tone indices. The first set of tone indices may be associated with a set of even number indexed slots of the PRACH period, and the second set of tone indices may be associated with a set of odd number indexed slots of the PRACH period. The second set of tone indices may be based on the first set of tone indices and an offset value. For example, referring to FIG. 2, the base station 202 may receive a transmission 206 from the UE 204 within the PRACH period 210. The transmission 206 may be received on an allocated set of resources (e.g., slots 0, 1, and 2 of the PRACH resource block 220) within the PRACH period 210. Each slot may have 10 symbols of which 2 (e.g., symbol 3, symbol 7) may allocated for pilot signal transmission. Assuming logical tone index 0 has been allocated for pilot signal transmission, and the offset value is 6, the transmission 206 may include pilot signals received at slot 0, symbols 3 and 7 at tone index 0. Pilot signals may be received at slot 1, symbols 3 and 7 at tone index 6, and pilot signals may be received at slot 2, symbols 3 and 7, at tone index 0. The transmission 206 may include an identifier associated with the UE 204, control information (e.g., resource allocation request), and a pathloss report.

At step 504, the eNB may determine a channel phase offset based on the received data transmission. In one configuration, the eNB may determine a channel phase offset by performing the steps 506 and 508. At step 506, the eNB may determine a first channel phase offset based on the received data transmission. At step 508, the eNB may determine a second channel phase offset based on the received data transmission. For example, the base station 202 may determine one or more first channel phase offsets. The base station 202 may determine a first channel phase offset based on the pilot signal received at slot 0, symbol 3, tone index 0 and the pilot signal received at slot 0, symbol 7, tone index 0. In another example, the base station 202 may determine a different first channel phase offset based on the pilot signal received at slot 1, symbol 3, tone index 6 and the pilot signal received at slot 1, symbol 7, tone index 6. In another example, the base station 202 may determine yet another first channel phase offset based on the pilot signal received at slot 2, symbol 3, tone index 0 and the pilot signal received at slot 0, symbol 7, tone index 0.

Similarly, the base station 202 may determine one or more second channel phase offsets. The base station 202 may determine a second channel phase offset based on the first channel phase offset, the pilot signal received at slot 0, symbol 3, tone index 0, and the pilot signal received at slot 1, symbol 3, tone index 6. The base station 202 may determine a different second channel phase offset based on the different first channel phase offset, the pilot signal received at slot 0, symbol 7, tone index 0, and the pilot signal received at slot 1, symbol 7, tone index 6.

At step 510, the eNB may determine a timing offset based on the determined channel phase offset. In an aspect, the eNB may determine the timing offset by determining the timing offset based on the first channel phase offset and the second channel phase offset. For example, the base station 202 may determine the timing offset based on the first and second channel phase offset.

Finally, at step 512, the eNB may transmit an acknowledgment message to the UE, wherein the acknowledgment message includes the determined timing offset. In an aspect, the acknowledgement message may include a resource allocation. For example, the base station 202 may transmit an acknowledgment message 208 to the UE 204. The acknowledgment message 208 may include acknowledgement indicating that the transmission 206 (including the data and pilot signals) was successfully received from the UE 204, the timing offset (or timing advance) determined based on the transmission 206 from the UE 204, and a resource allocation for the UE 204.

Figure 6:
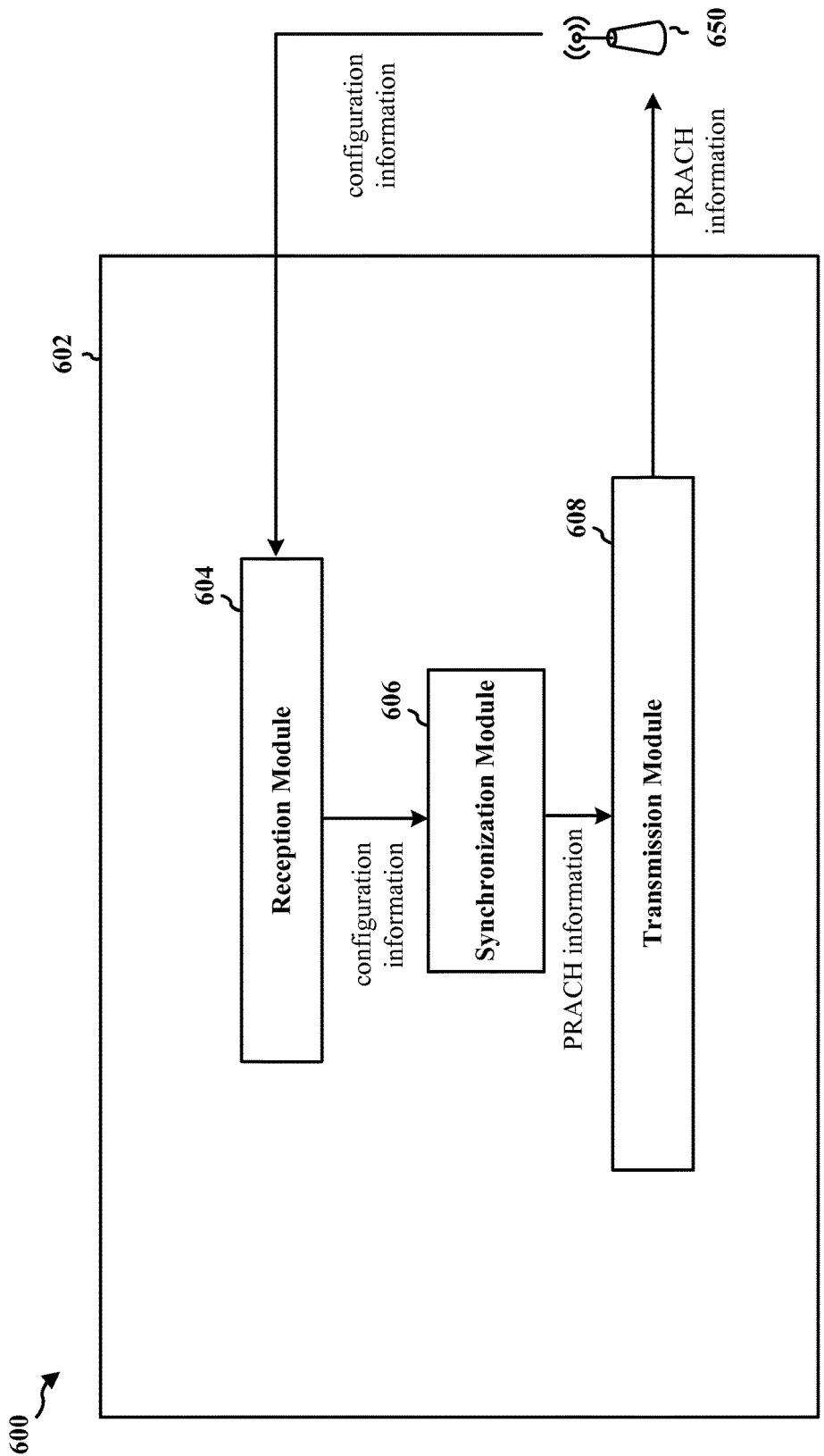
FIG. 6 is a conceptual data flow diagram illustrating the data flow between different modules/means/components in an exemplary apparatus.

FIG. 6 is a conceptual data flow diagram 600 illustrating the data flow between different modules/means/components in an exemplary apparatus 602. The apparatus may be a UE. The apparatus includes a reception module 604, a synchronization module 606, and a transmission module 608. The reception module 604 may be configured to receive configuration information from a base station 650, and the configuration information may indicate when a PRACH period occurs. The synchronization module 606 may be configured to determine an allocated set of resources within a PRACH period. In one configuration, the synchronization module 606 may determine the allocated set of resources based on configuration information received from the reception module 604. The configuration information may include UE identification information and PRACH selection information. In an aspect, the PRACH period may have a set of slots, and each slot in the set of slots may include a set symbols, and each symbol in each set of symbols may include a set of tones. In this aspect, the synchronization module 606 may be configured to determine an allocated set of resources by determining a subset of slots within the set of slots in the PRACH period for transmitting the pilot signals. The subset of slots may include a set of even number indexed slots and a set of odd number indexed slots. The synchronization module 606 may be configured to determine a first set of tone indices in the set of even number indexed slots for transmitting a first set of pilot signals and determine a second set of tone indices in the set of odd number indexed slots for transmitting a second set of pilot signals. The second set of tone indices may be based on the first set of tone indices and an offset value. In another aspect, the first set of pilot signals may have at least two pilot signals, and the second set of pilot signals may have at least two pilot signals. The transmission module 608 may be configured to transmit pilot signals in the determined allocated set of resources to the base station 650. In another configuration, the transmission module 608 may be configured to transmit information in the determined allocated set of resources to the base station 650. The information may include at least one of an identifier, control information, or a pathloss report.

The apparatus may include additional modules that perform each of the blocks of the algorithm in the aforementioned flow charts of FIG. 5. As such, each block in the aforementioned flow charts of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 7:
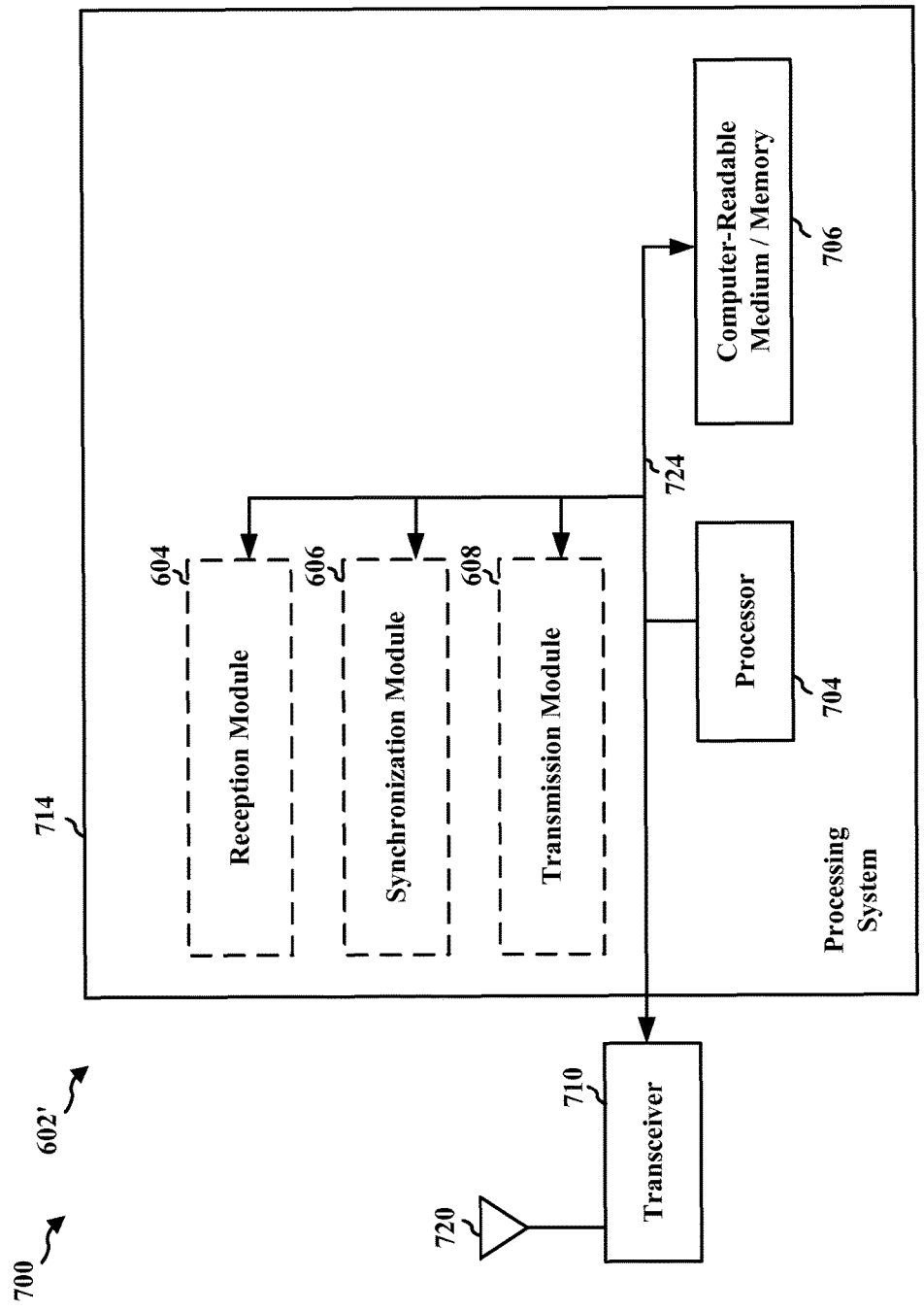
FIG. 7 is a diagram illustrating an example of a hardware implementation for an apparatus employing a processing system.

FIG. 7 is a diagram 700 illustrating an example of a hardware implementation for an apparatus 602' employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 704, the modules 604, 606, 608, and the computer-readable medium/memory 706. The bus 724 may also link various other circuits such as timing sources, peripherals, voltage regulators, and power management circuits, which are well known in the art, and therefore, will not be described any further.

The processing system 714 may be coupled to a transceiver 710. The transceiver 710 is coupled to one or more antennas 720. The transceiver 710 provides a means for communicating with various other apparatus over a transmission medium. The transceiver 710 receives a signal from the one or more antennas 720, extracts information from the received signal, and provides the extracted information to the processing system 714, specifically the reception module 604. In addition, the transceiver 710 receives information from the processing system 714, specifically the transmission module 608, and based on the received information, generates a signal to be applied to the one or more antennas 720. The processing system 714 includes a processor 704 coupled to a computer-readable medium/memory 706. The processor 704 is responsible for general processing, including the execution of software stored on the computer-readable medium/memory 706. The software, when executed by the processor 704, causes the processing system 714 to perform the various functions described supra for any particular apparatus. The computer-readable medium/memory 706 may also be used for storing data that is manipulated by the processor 704 when executing software. The processing system further includes at least one of the modules 604, 606, and 608. The modules may be software modules running in the processor 704, resident/stored in the computer readable medium/memory 706, one or more hardware modules coupled to the processor 704, or some combination thereof.

In one configuration, the apparatus 602/602' for wireless communication includes means for determining an allocated set of resources within a PRACH period. The apparatus further includes means for transmitting pilot signals in the determined allocated set of resources. In an aspect, the PRACH period may have a set of slots, and each slot in the set of slots may include a set symbols, and each symbol in each set of symbols may include a set of tones. In one configuration, the means for determining an allocated set of resources may be configured to determine the allocated set of resources by determining a subset of slots within the set of slots in the PRACH period for transmitting the pilot signals, in which the subset of slots includes a set of even number indexed slots and a set of odd number indexed slots, determining a first set of tone indices in the set of even number indexed slots for transmitting a first set of pilot signals, and determining a second set of tone indices in the set of odd number indexed slots for transmitting a second set of pilot signals, in which the second set of tone indices may be based on the first set of tone indices and an offset value. In an aspect, the first set of pilot signals may have at least two pilot signals, and the second set of pilot signals may have at least two pilot signals. The apparatus may further include means for transmitting information in the determined allocated set of resources. The information may include at least one of an identifier, control information, or a pathloss report. The aforementioned means may be one or more of the aforementioned modules of the apparatus 602 and/or the processing system 714 of the apparatus 602' configured to perform the functions recited by the aforementioned means.

Figure 8:
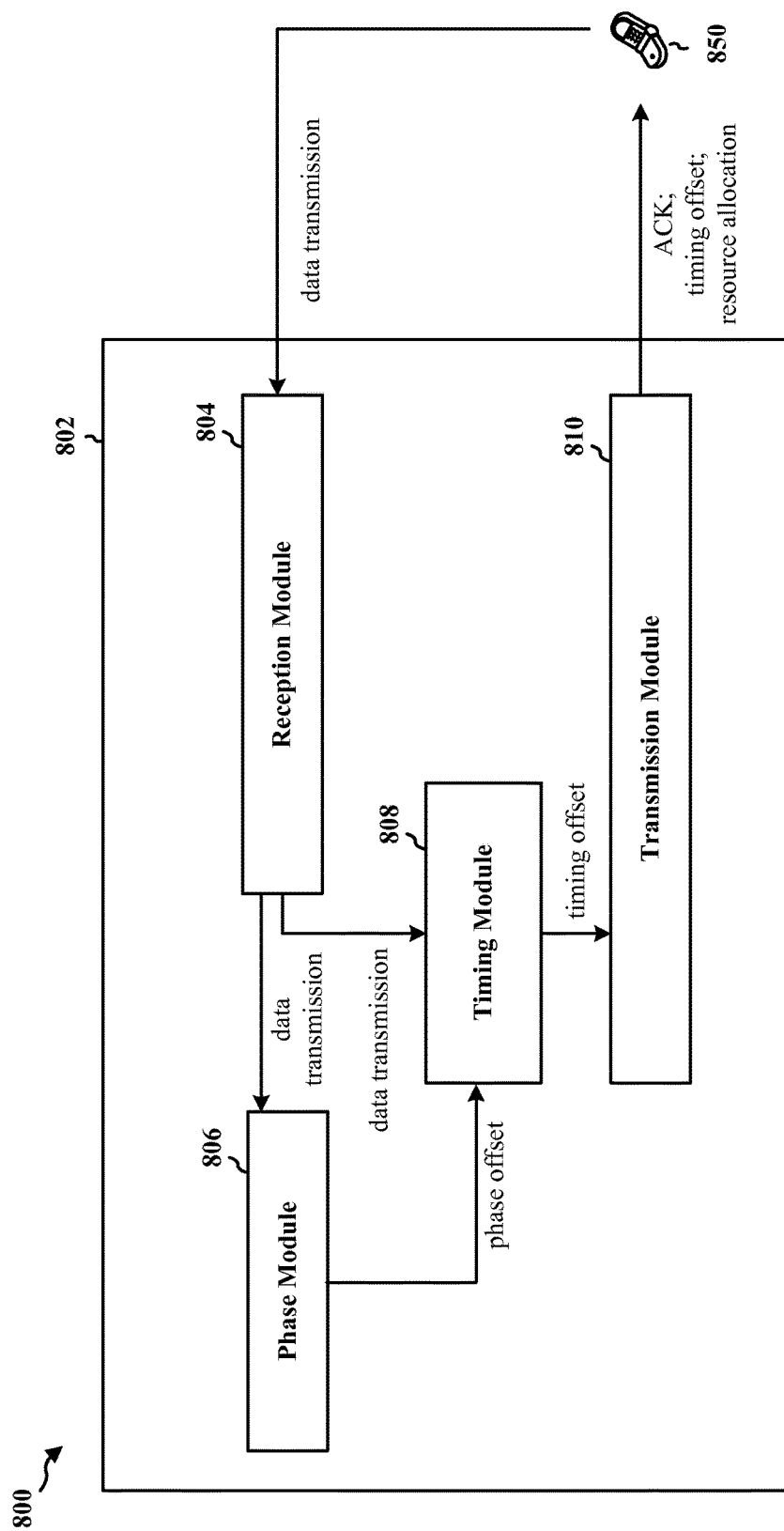
FIG. 8 is a conceptual data flow diagram illustrating the data flow between different modules/means/components in an exemplary apparatus.

FIG. 8 is a conceptual data flow diagram 800 illustrating the data flow between different modules/means/components in an exemplary apparatus 802. The apparatus may be an eNB. The apparatus includes a reception module 804, a phase module 806, a timing module 808, and a transmission module 810. The reception module 804 may be configured to receive a data transmission from a UE 850. The phase module 806 may be configured to determine a channel phase offset based on the received data transmission. The timing module 808 may be configured to determine a timing offset based on the determined channel phase offset. The transmission module 810 may be configured to transmit an acknowledgment message to the UE 850. The acknowledgment message may include the determined timing offset. In an aspect, the data transmission may be received in an allocated set of resources within a PRACH period. In this aspect, the data transmission may include pilot signals, and the pilot signals may be received in a first set of tone indices and a second set of tone indices. The first set of tone indices may be associated with a set of even number indexed slots of the PRACH period, and the second set of tone indices may be associated with a set of odd number indexed slots of the PRACH period. The second set of tone indices may be based on the first set of tone indices and an offset value. In another aspect, the data transmission may include at least one of an identifier, control information, or a pathloss report. In one configuration, the phase module 806 may be configured to determine the channel phase offset by determining a first channel phase offset based on the received data transmission and determining a second channel phase offset based on the received data transmission. In this configuration, the timing module 808 may be configured to determine the timing offset by determining the timing offset based on the first channel phase offset and the second channel phase offset.

The apparatus may include additional modules that perform each of the blocks of the algorithm in the aforementioned flow charts of FIG. 5. As such, each block in the aforementioned flow charts of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 9:
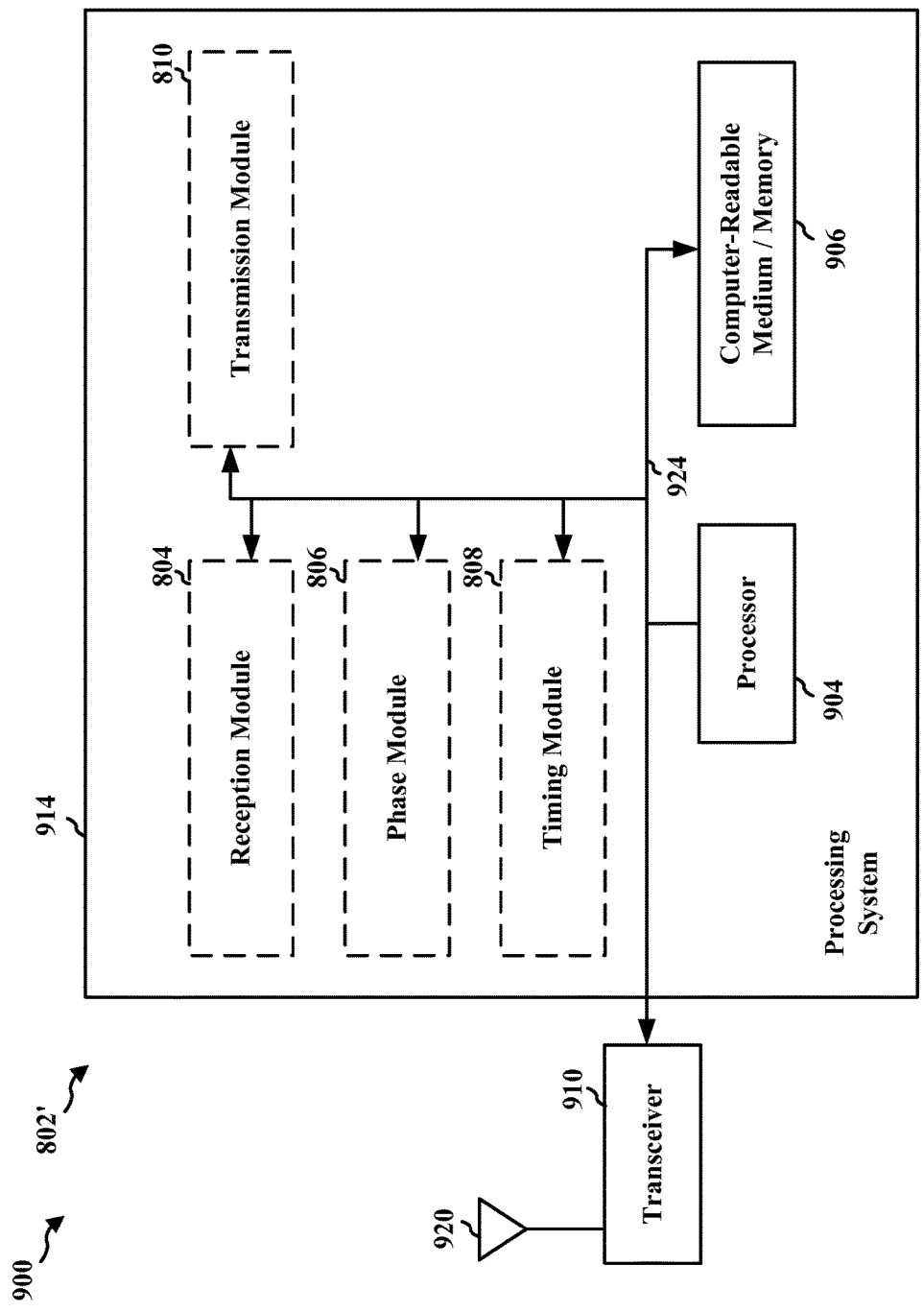
FIG. 9 is a diagram illustrating an example of a hardware implementation for an apparatus employing a processing system.

FIG. 9 is a diagram 900 illustrating an example of a hardware implementation for an apparatus 802' employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, the modules 804, 806, 808, 810, and the computer-readable medium/memory 906. The bus 924 may also link various other circuits such as timing sources, peripherals, voltage regulators, and power management circuits, which are well known in the art, and therefore, will not be described any further.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception module 804. In addition, the transceiver 910 receives information from the processing system 914, specifically the transmission module 810, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described supra for any particular apparatus. The computer-readable medium/memory 906 may also be used for storing data that is manipulated by the processor 904 when executing software. The processing system further includes at least one of the modules 804, 806, 808, 810. The modules may be software modules running in the processor 904, resident/stored in the computer readable medium/memory 906, one or more hardware modules coupled to the processor 904, or some combination thereof.

In one configuration, the apparatus 802/802' for wireless communication includes means for receiving a data transmission from a UE. The apparatus may include means for determining a channel phase offset based on the received data transmission. The apparatus may include means for determining a timing offset based on the determined channel phase offset. The apparatus may include means for transmitting an acknowledgment message to the UE. The acknowledgment message may include the determined timing offset. In an aspect, the data transmission is received in an allocated set of resources within a PRACH period. In another aspect, the data transmission may include pilot signals, and the pilot signals may be received in a first set of tone indices and a second set of tone indices. The first set of tone indices may be associated with a set of even number indexed slots of the PRACH period, and the second set of tone indices may be associated with a set of odd number indexed slots of the PRACH period. The second set of tone indices may be based on the first set of tone indices and an offset value. In another aspect, the data transmission may include at least one of an identifier, control information, or a pathloss report. In one configuration, the means for determining the channel phase offset may be configured to determine a first channel phase offset based on the received data transmission and determine a second channel phase offset based on the received data transmission. In this configuration, the means for determining the timing offset may be configured to determine the timing offset based on the first channel phase offset and the second channel phase offset. The aforementioned means may be one or more of the aforementioned modules of the apparatus 802 and/or the processing system 914 of the apparatus 802' configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication by a user equipment (UE), comprising:
    determining an allocated set of resources, within a physical random access channel (PRACH) period, designated for uplink synchronization, wherein the PRACH period comprises a set of slots, and each slot of the set of slots comprises a set of symbols, and wherein the determining the allocated set of resources comprises:
        determining a first set of symbols and a second set of symbols within the PRACH period for transmitting pilot signals,
        determining a first set of tone indices within the first set of symbols for transmitting a first set of pilot signals, and
        determining a second set of tone indices within the second set of symbols for transmitting a second set of pilot signals, wherein the second set of tone indices is determined based on an offset value from the first set of tone indices; and
    transmitting the first and second sets of pilot signals in the determined allocated set of resources to a device to enable uplink synchronization with the device.

2. The method of claim 1, wherein each symbol of each set of symbols comprises a set of tones.

3. The method of claim 1, wherein the determining the allocated set of resources further comprises determining a subset of symbols within each slot in the subset of slots in the PRACH period for transmitting the first and second sets of pilot signals, wherein the subset of symbols within each slot is greater than or equal to 2.

4. The method of claim 1, wherein the first set of pilot signals has at least two pilot signals, and the second set of pilot signals has at least two pilot signals.

5. The method of claim 1, further comprising transmitting information in the determined allocated set of resources, wherein the information comprises at least one of an identifier, control information, or a pathloss report.

6. The method of claim 1, wherein the determining the allocated set of resources further comprises:
    determining at least a third set of symbols within the PRACH period of transmitting pilot signals;

determining at least a third set of tone indices within the third set of symbols for transmitting a third set of pilot signals, wherein the third set of tone indices is determined based on a second offset value from the second set of tone indices; and transmitting the third set of pilot signals in the determined allocated set of resources to the device.

7. The method of claim 6, wherein the third set of symbols is different from the second set of symbols.

8. The method of claim 6, wherein the second offset value is the same as or different from the offset value.

9. The method of claim 6, wherein the offset value and the second offset value have values greater than or equal to one.

10. The method of claim 1, wherein only pilot signals are transmitted in the set of symbols or information signals and pilot signals are transmitted in the set of symbols.

11. An apparatus for wireless communication, comprising:
a memory; and
at least one processor coupled to the memory and configured to:
determine an allocated set of resources, within a physical random access channel (PRACH) period, designated for uplink synchronization, wherein the PRACH period comprises a set of slots, and each slot of the set of slots comprises a set of symbols, and wherein the at least one processor is configured to determine the allocated set of resources by:
determining a first set of symbols and a second set of symbols within the PRACH period for transmitting pilot signals,
determining a first set of tone indices within to the first set of symbols for transmitting a first set of pilot signals, and
determining a second set of tone indices within the second set of symbols for transmitting a second set of pilot signals, wherein the second set of tone indices is determined based on an offset value from the first set of tone indices; and
transmit the first and second sets of pilot signals in the determined allocated set of resources to a device to enable uplink synchronization with the device.

12. The apparatus of claim 11, wherein each symbol in each set of symbols comprises a set of tones.

13. The apparatus of claim 11, wherein the at least one processor is configured to determine the allocated set of resources by determining a subset of symbols within each slot in the subset of slots in the PRACH period for transmitting the first and second sets of pilot signals, wherein the subset of symbols within each slot is greater than or equal to 2.

14. The apparatus of claim 11, wherein the first set of pilot signals has at least two pilot signals, and the second set of pilot signals has at least two pilot signals.

15. The apparatus of claim 11, wherein the at least one processor is further configured to transmit information in the determined allocated set of resources, wherein the information comprises at least one of an identifier, control information, or a pathloss report.

\* \* \* \* \*